INVENTORS.
ROBERT A. REMNER
JAMES W. SCHUETZ
BY Bosworth, Sessions,
Herestron + Knowles
ATTORNEYS.

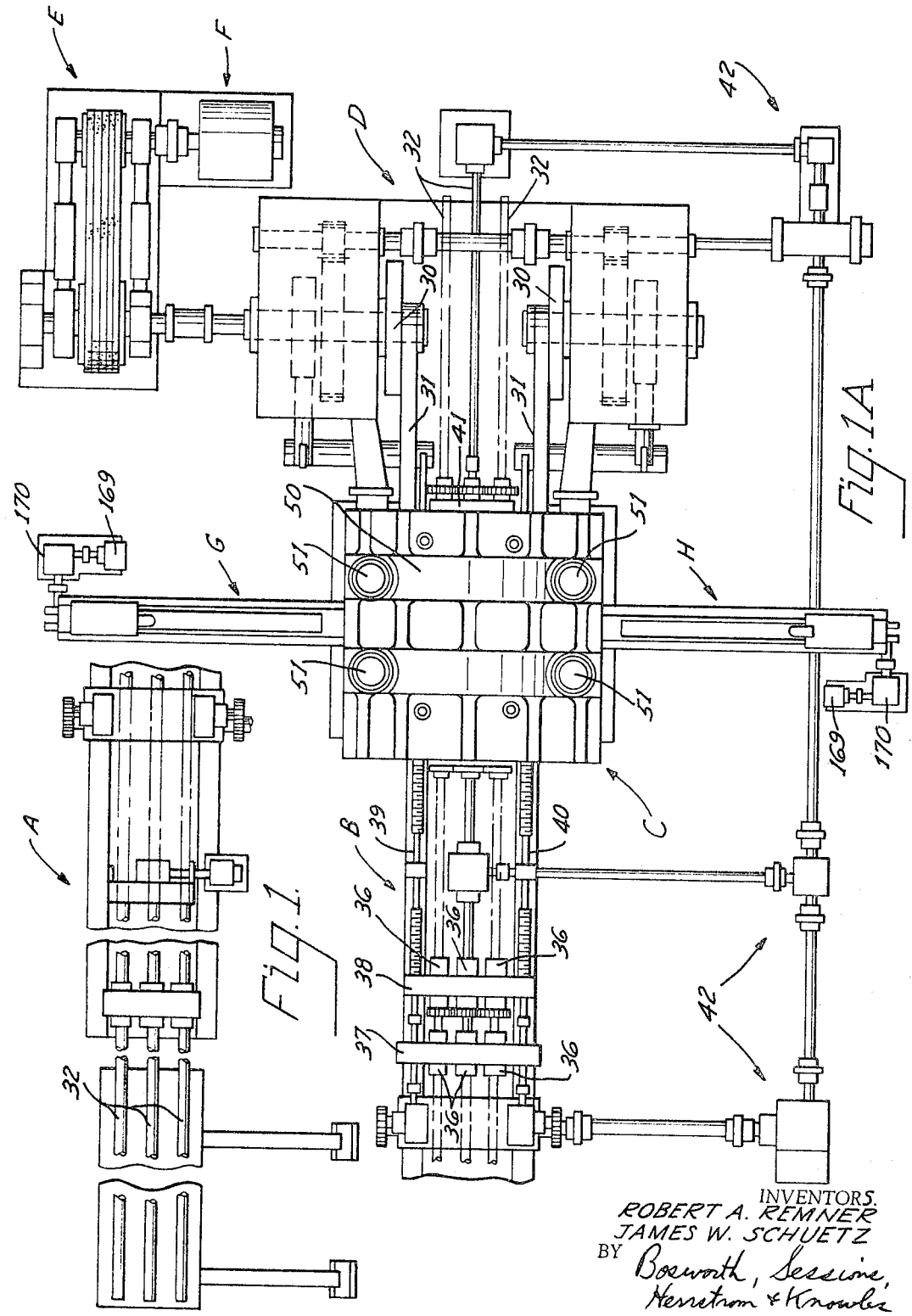

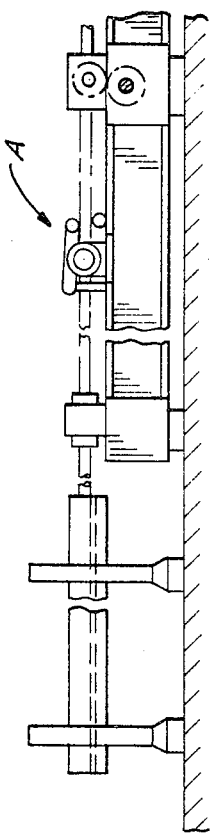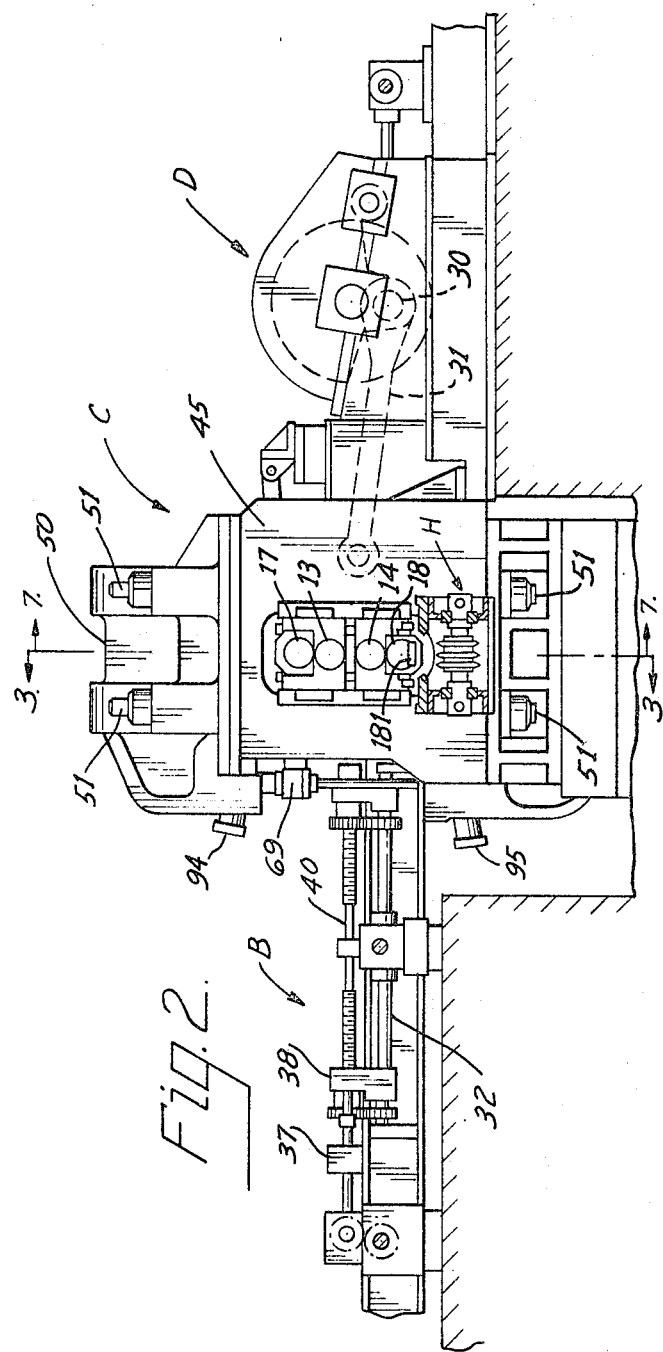

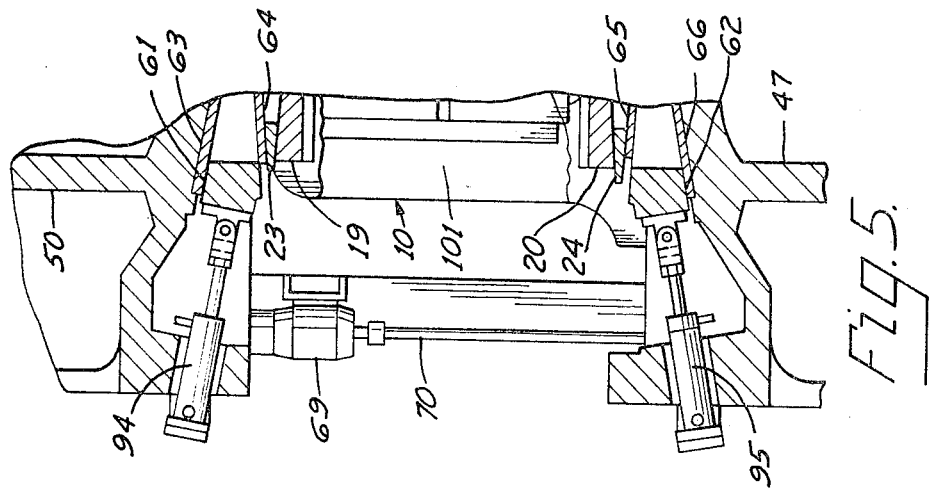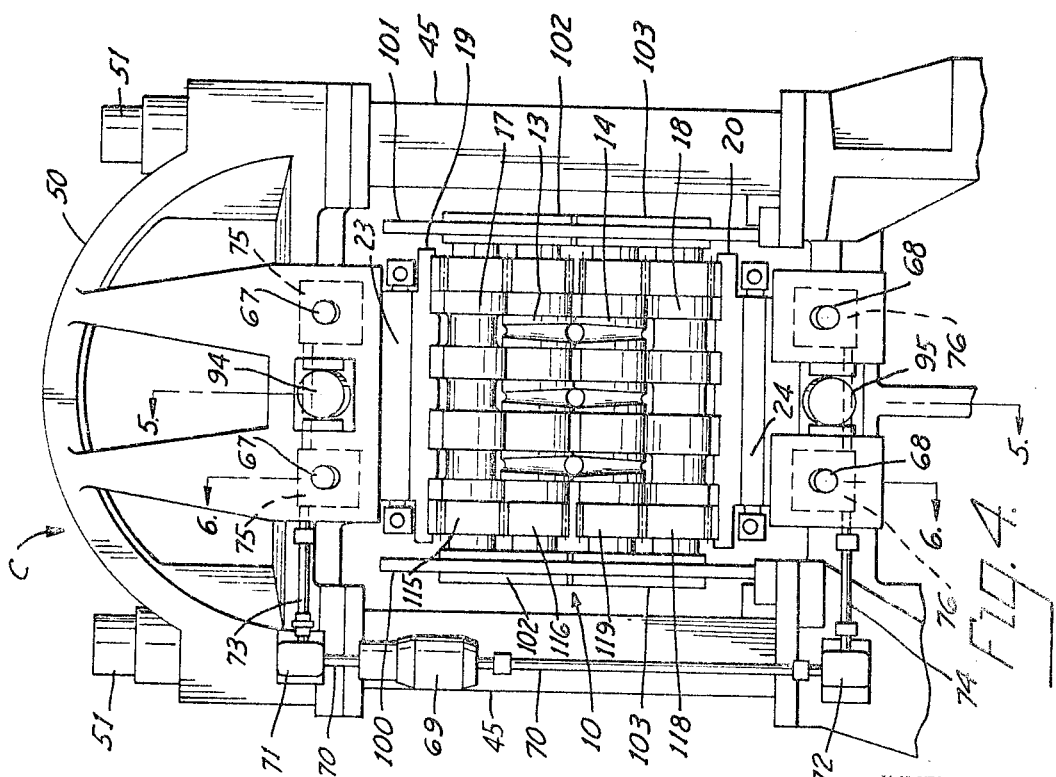

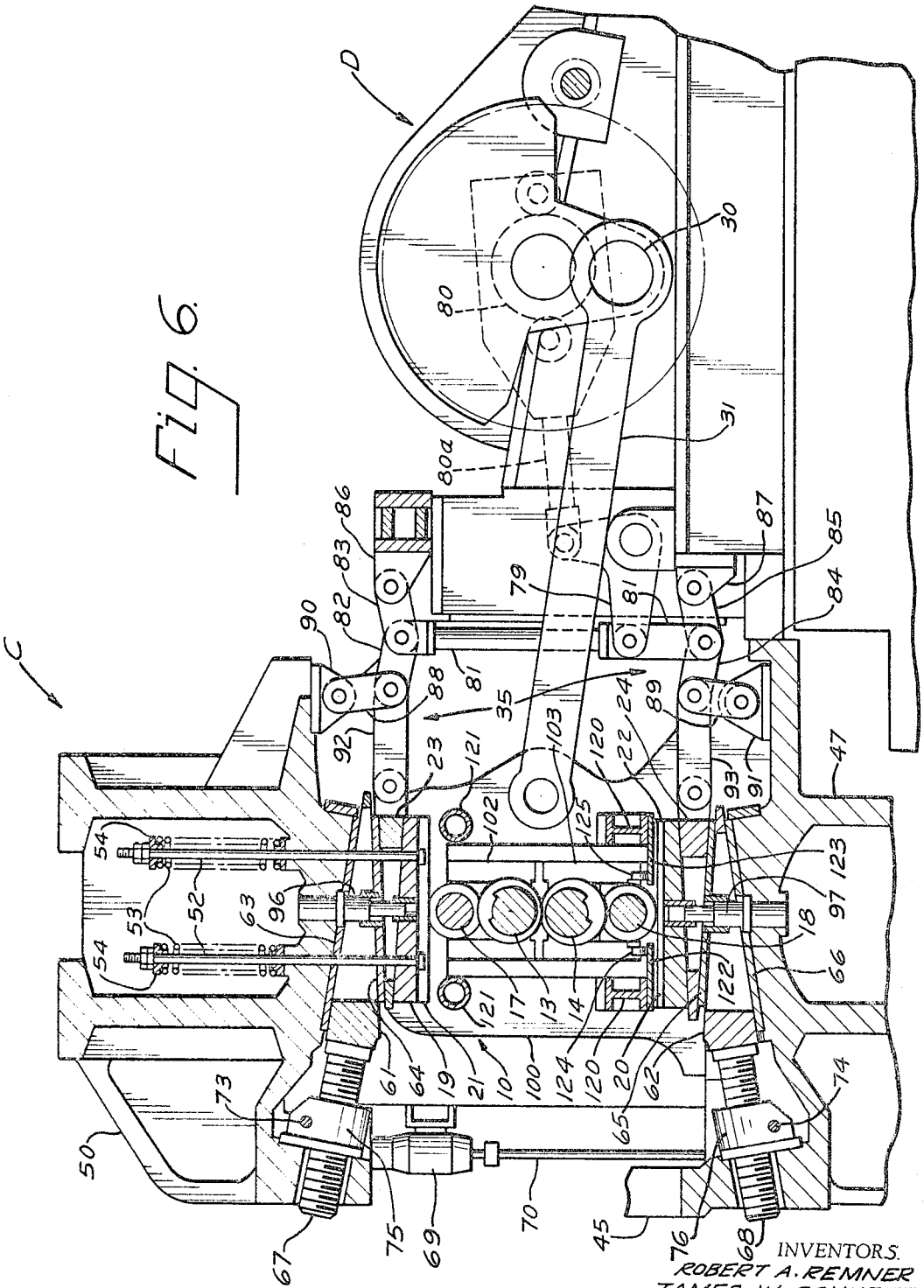

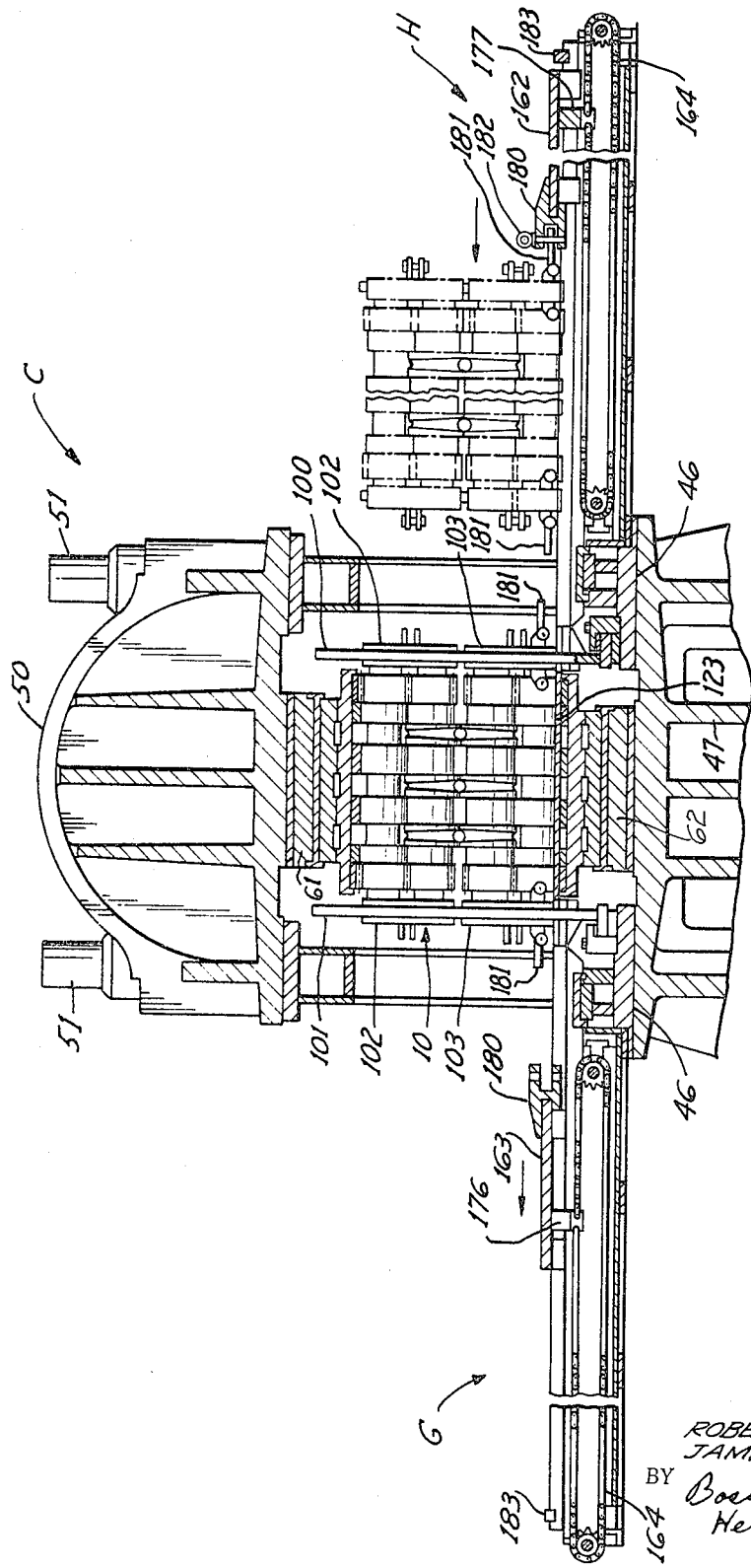

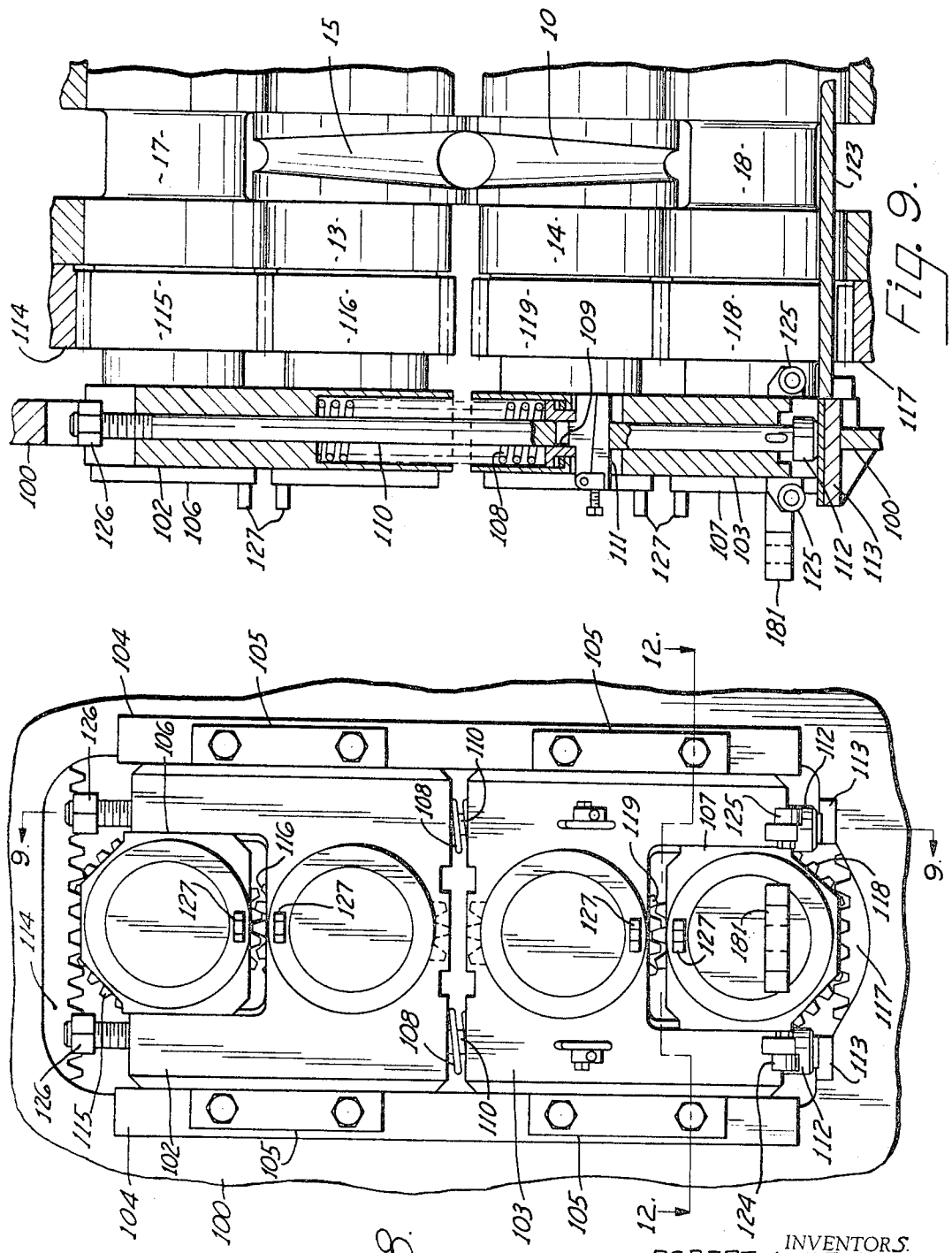

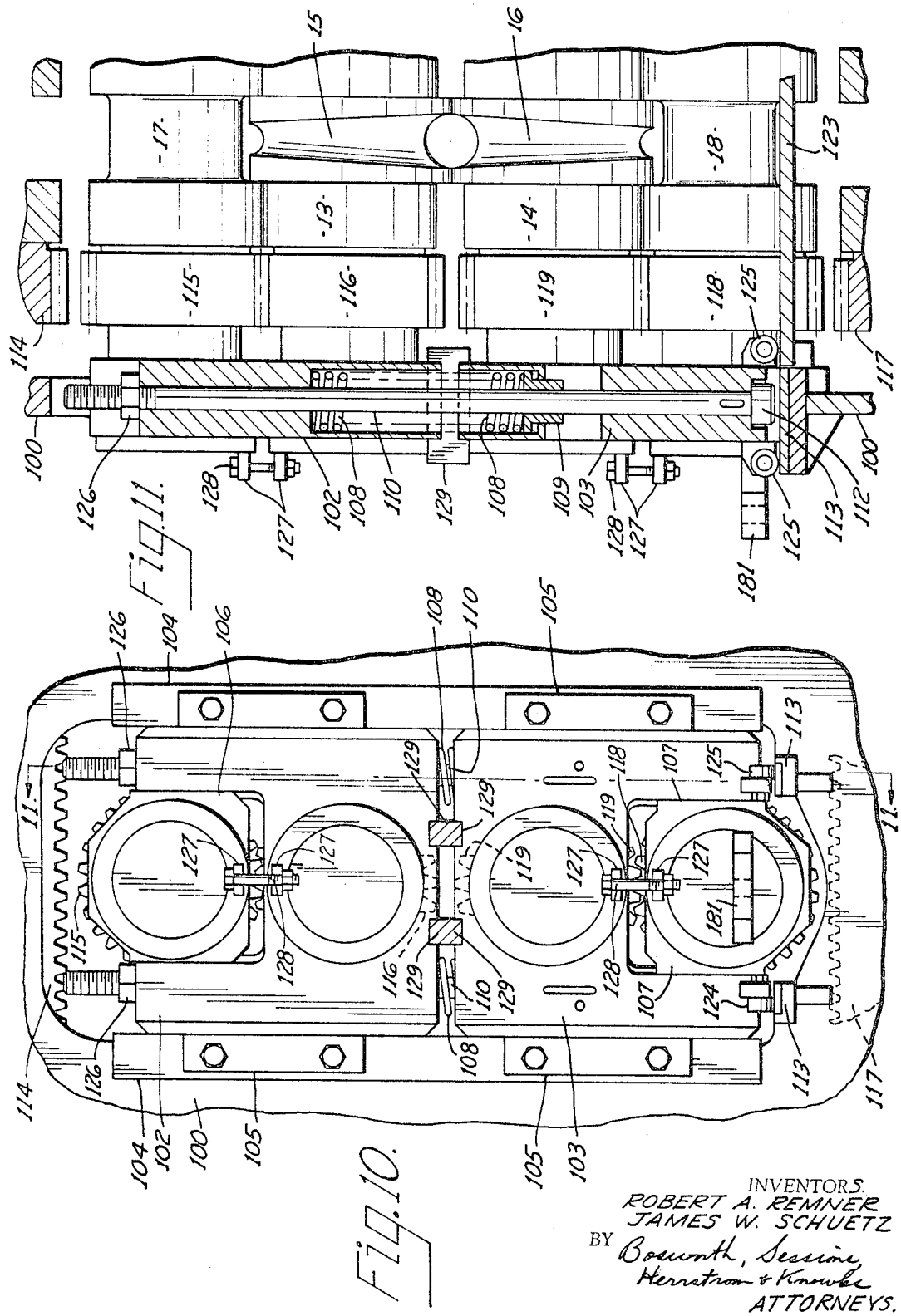

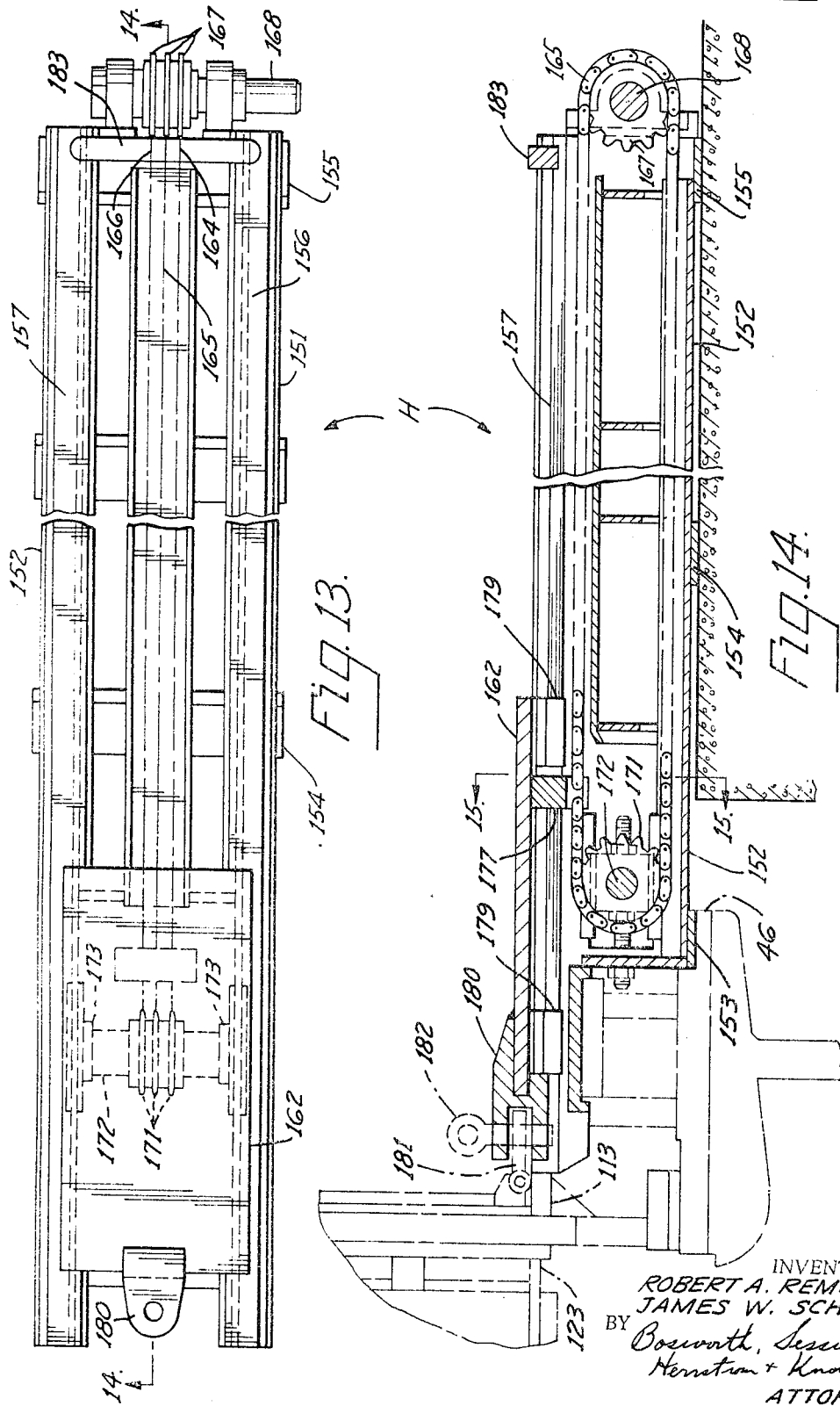

United States Patent Office 3,433,046
Patented Mar. 18, 1969

3,433,046
ROLL CHANGING MECHANISM FOR
ROLLING MILLS
Robert A. Renner, Glenshaw, and James W. Schuetz,
Pittsburgh, Pa., assignors to Blaw-Knox Company,
Pittsburgh, Pa., a corporation of Delaware
Filed Aug. 17, 1966, Ser. No. 573,091
U.S. Cl. 72—239                                        11 Claims
Int. Cl. B21b 31/08, 17/00

ABSTRACT OF THE DISCLOSURE

An improved construction for rolling machines that form elongated work pieces such as tubes, rods, bars and the like by reciprocating pairs of rolls while advancing the work pieces into the rolls. The improvement enables the rolls to be rapidly changed by means of adjusting wedges interposed between the thrust plate of a roll unit and the machine housing. The wedges may be easily and quickly withdrawn to separate the roll unit from the housing and thus facilitate removal and replacement of the roll units.

---

This invention relates to machines for rolling elongated workpieces such as tubes, rods, bars and the like, in which the rolls that do the work are reciprocated and the workpieces are intermittently advanced into the bite of the rolls. More particularly, the invention relates to an improved roll changing mechanism for such machines.

Machines of this general type adapted to roll tubular workpieces between grooved die rolls in order to elongate the workpieces and reduce their wall thickness and diameter are well-known. They comprise a roll supporting saddle which is reciprocated in a horizontal plane by a drive mechanism. The saddle carries die rolls having opposed grooves adapted to do work on one or more tube blanks or other workpieces interposed between the rolls. As the saddle reciprocates, the rolls are rotated by engagement between gears mounted on the rolls and racks mounted on the frame on which the saddle reciprocates. This type of machine is described in United States Patent No. 3,030,835 to Krause.

In machines of this type, it is necessary to change the die rolls in order to adapt the machine to work on workpieces of different diameters or shapes or to produce work having different diameters or shapes. It is also necessary to remove the die rolls periodically to provide for dressing or otherwise repairing or reconditioning the rolls.

One form of mechanism for changing the die rolls of this type of machine is shown in United States Patent No. 3,199,326 to Wadleck, et al. According to this patent, changing of the rolls is accomplished by means of a roll changer mechanism including a conveyor mounted adjacent one side of the mill housing and which is adapted to receive the die rolls, back-up rolls and bearing blocks fastened together as a unitary assembly, as they are withdrawn through an opening in the side of the saddle. Replacement of the rolls is accomplished by relaxing the thrust plates on which the back-up rolls ride to provide a clearance between the back-up rolls and the thrust plates, and then securing the bearing blocks for the working rolls and back-up rolls together so that the entire assembly may be moved as a unit. In order to accomplish this, the cap of the mill housing is raised to provide sufficient clearance for removal of the assembly. Hydraulic cylinders are provided which serve to lift the cap from the housing when desired. During operation of the machine, the cap is secured to the housing by means of locking arms connected to the sides of the housing.

Once the die rolls, back-up rolls and bearing blocks have been carried out of the saddle and mill housing on the conveyor, they are removed by a suitable handling device such as an overhead crane. A replacement assembly may then be positioned on the same conveyor and moved into the saddle within the mill housing.

While this construction affords many advantages over the prior art, considerable time is still required for changing the rolls since the mill housing cap must be loosened, raised, lowered and again secured, and the old roll assembly must be removed from the conveyor before the new assembly can be positioned preparatory to its insertion in the saddle.

The present invention provides an improved type of roll changing device which satisfies the objections indicated above and which affords other features and advantages not obtainable from the prior art.

According to one aspect of the invention, two roll changing conveyors are provided, one on each side of the mill housing. The mill housing and saddle are accordingly provided with means for removing one roll assembly from within the machine to one side of the machine, while at the same time moving another assembly into the apparatus from the opposite side of the housing, thus eliminating delays due to crane handling time.

According to another aspect of the invention, the mill housing is provided at the top and bottom thereof with adjusting wedges, the wedges being used to move the thrust plates within the housing to a spacing which permits the roll assembly to be removed and replaced without disturbing the cap of the mill housing and also to provide for adjustment of the thrust plates to accommodate different roll sizes.

An object of the invention is to provide a rolling machine or mill of the type embodying a reciprocating saddle or carriage for carrying the working rolls of the mill, in which provision is made for removing the rolls as a unitary assembly and replacing them with another assembly with a minimum of time loss.

Another object of the invention is to avoid the necessity of raising the cap of the mill housing during the roll changing operation.

A further object of the invention is to provide for the adjustment of the thrust plates carried at the top and bottom of the mill housing to accommodate dies and back-up rolls of various diameters and also to provide for "pre-load" adjustment.

Other objects and advantages of the invention will be apparent from the following detailed description of a preferred form thereof, reference being made to the accompanying drawings. The essentials of the invention are summarized in the claims.

Referring to the drawings:

FIGURE 1 and 1A together constitute a plan view of a tube rolling machine made according to the aforesaid Krause patent and embodying the present invention;

FIGURES 2 and 2A together constitute a side elevation of the machine shown in FIGURES 1 and 1A;

FIGURE 4 is a fragmentary end elevational view showing the mill housing and saddle of the machine of FIGURES 1 and 2;

FIGURE 5 is a fragmentary sectional view taken on the line 5—5 of FIGURE 4;

FIGURE 6 is a fragmentary sectional view taken on the line 6—6 of FIGURE 4 and showing the mechanism for reciprocating the saddle in the housing;

FIGURE 7 is a sectional view taken on the line 7—7 of FIGURE 2 and showing the roll changing mechanism located at opposite sides of the mill housing;

FIGURE 8 is a fragmentary side elevational view showing the saddle in which the die rolls and back-up rolls are located and showing the roll assembly in its operating condition;

FIGURE 9 is a fragmentary sectional view taken on the line 9—9 of FIGURE 8;

FIGURE 10 is a fragmentary side elevational view showing the mill housing and saddle with the back-up rolls and bearing blocks in position for replacement;

FIGURE 11 is a fragmentary sectional view taken on the line 11—11 of FIGURE 10;

FIGURE 13 is a plan view showing the roll changing mechanism at one side of the mill housing;

FIGURE 14 is a fragmentary sectional view taken on the line 14—14 of FIGURE 13.

General arrangment

Figure 3:
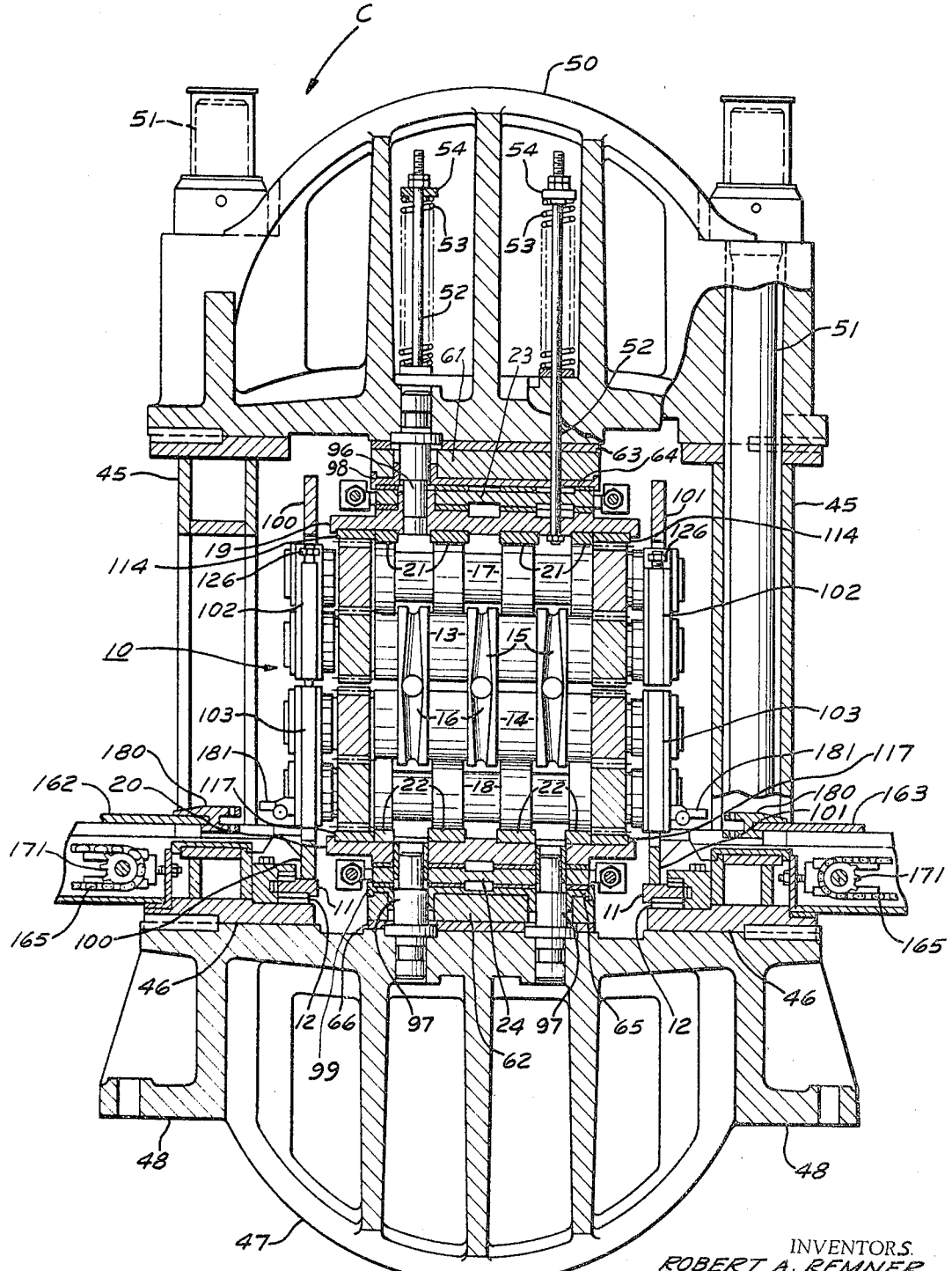
FIGURE 3 is a transverse sectional view, on an enlarged scale, taken on the line 3—3 of FIGURE 2 with parts broken away to show further details of the construction.

FIGURES 1, 1A, 2 and 2A of the drawings show the general arrangement of a preferred form of the machine which is similar to the machine shown in the aforementioned United States Patent No. 3,199,326. The machine generally comprises a mandrel anchor table A, a feed table B, a mill housing C, a saddle operating mechanism D, a motor F, a drive unit E, a roll cartridge removal conveyor G and a roll cartridge replacement conveyor H, the conveyors G and H being located on opposite sides of the mill housing C. Located within the mill housing C is a saddle 10 which is supported for reciprocating movement upon slides 11 that operate on tracks 12 as shown in FIGURE 3. The saddle 10 carries working or die rolls 13 and 14 which are provided with a plurality of die recesses or grooves 15 and 16, respectively, so that the rolls can work simultaneously on a plurality of workpieces. The working rolls are supported by back-up rolls 17 and 18 which are supported by thrust plates 19 and 20, respectively. Mounted on the thrust plates 19 and 20 are wear plates 21 and 22 which are engaged by the back-up rolls 17 and 18 during reciprocation of the saddle 10. The thrust plates 19 and 20 are supported by movable operating wedges 23 and 24 when the wedges are in their working or forward position so as to hold the die rolls 13 and 14 in their working position as shown in FIGURE 3. When the wedges 23 and 24 are withdrawn, the rolls 13 and 14 move apart and are disengaged from the workpieces.

The saddle 10 is reciprocated on its tracks 12 by means of the saddle operating unit D which is disposed at the exit or discharge end of the machine, see FIGURES 1 and 2. The unit D includes cranks 30 which are disposed on either side of the pass line of the machine and which are connected to the saddle 10 by means of connecting rods 31. The cranks 30 are rotated at speeds of the order of 80 to 100 or more revolutions per minute although this may be varied throughout a considerable range. Reciprocation of the saddle 10 by the connecting rods 31 causes the die rolls 13 and 14 and the back-up rolls 17 and 18 to rotate. Positive rotation of these rolls is insured by the provision of racks and pinions as described below. The tubes or other workpieces are fed into the working zone of the machine from the left in the arrangement shown in FIGURES 1 and 2 of the drawings and are discharge to the right. The working stroke of the die rolls 13 and 14 takes place as the saddle 10 is moved from left to right. When the workpieces are tubular, they are supported during the rolling operation by mandrels 32 having tapered points as described in the aforesaid United States Patent No. 3,030,835.

The operating wedges 23 and 24 are withdrawn at the end of each working stroke of the saddle 10 and replaced at the end of each return stroke by means of the wedge operating mechanism indicated in general at 35 in FIGURE 6 so that no work is done upon the tubes during the return stroke of the saddle and rolls. During the return stroke, the tubes are advanced and rotated a fraction of a revolution by chucks 36 carried by crossheads 37 and 38 disposed on the entry side of the machine. These cross-heads are moved in opposite directions along the frame of the machine by feed screws 39 and 40 so that the crossheads alternately approach and withdraw from each other. As explained in the aforesaid Krause patent, the chucks 36 in the crossheads 37 and 38 are alternately caused to grip the work and to release the work so that the tubes are advanced through the machine. A crosshead 41 is also provided at the exit end of the machine to insure rotation of the tubes after the blanks have been removed by both crosshead 37 and crosshead 38. The crossheads 37 and 38 are moved toward and away from each other and the chucks are rotated by the chuck rotating and advancing mechanism indicated in general at 42. These mechanisms and the mechanisms whereby the mandrels 32 are supported so that they can be loaded without stopping the machine are all illustrated and described in detail in the aforesaid Krause patent. Inasmuch as these mechanisms are no part of the present invention, they are not described in detail herein. The mechanism 35 for withdrawing and replacing the operating wedges and the chuck rotating and advancing mechanism 42 are both driven from the main drive and therefore all of the operations of the machine are mechanically synchronized.

Mill housing

The workpieces are rolled to the desired diameter and, in the case of tubular blanks to the desired wall thickness, by the die rolls 13 and 14 which are supported in the reciprocating saddle 10 that is in turn mounted in the mill housing C. These parts are shown particularly in FIGURES 3 to 6. The present invention relates to the construction of mill housing C, saddle 10 and associated parts so that the mill rolls can be removed from the saddle expeditiously and with a substantial reduction in labor and in downtime of the machine as compared to prior practice. As appears in detail below, this is accomplished by providing means for securing all four rolls together in an assembly that can be handled as a unit, and simultaneous removal and replacement of the assembly by means of a roll changing mechanism consisting of the two conveyors G and H located on opposite sides of the mill housing.

Inasmuch as the rolling forces exerted on the work are taken by the mill housing C, the housing is a massive structure made up of longitudinally extending vertical side plates 45. The side plates 45 are appropriately secured to and supported by horizontal base plates 46 which in turn are mounted on and secured to a massive arched and webbed base member 47 shown in FIGURES 3 to 6, and which is provided with a flange 48 so that the base 47 may be appropriately supported in a foundation structure. The base 47 supports the weight of the reciprocating saddle 10 through the tracks 12 which are mounted on the horizontal base plates 46.

The top of the mill housing C is completed by a cap 50 that is preferably arched and webbed as shown to take the rolling forces. The cap 50 rests on the upper edges of the side plates 45 and is held down against the rolling forces by tie rods 51 that are disposed on opposite sides of the housing C and that extend entirely through from the cap 50 to the base plate 46. The cap 50 like the base 47 takes the working pressure of the die rolls 13 and 14, the pressures being transmitted from the back-up roll 17 through the thrust plate 19. The thrust plate 19 and wedge 23 are urged upward toward the cap 50 by rods 52 which are biased upwardly by springs 53 acting between washers 54 secured to the upper end of the rods 52.

According to the present invention, the mill housing C is provided with adjusting wedges 61 and 62 as shown in FIGURES 3, 5 and 6. Wedge 61 is located above the saddle 10 between the operating wedge 23 and the cap 50 and is separated therefrom by stationary slide plates 63 and 64. Wedge 62 is located below the saddle 10 between the base 47 of the mill housing and the operating wedge 24 and is separated therefrom by slide plates 65 and 66. Withdrawal of adjusting wedges 61 and 62 permits the thrust plates 19 and 20 to move vertically away from the saddle to enable the rolls 13, 14, 17 and 18 to be removed from the machine. The adjusting wedges also provide for adjustment of the spacing between the thrust plates 19 and 20 to accommodate various sizes and types of rolls.

The adjusting wedges 61 and 62 are operated by jacks 67 and 68, the jacks 67, of which there are two, being adapted to operate the upper adjusting wedge 61 and the jacks 68, of which there also are two, being adapted to operate the lower adjusting wedge 62. As shown in FIGURES 4 and 6, the jacks 67 and 68 are operated by a drive motor 69 and drive shafts 70 which extend from either end thereof to upper and lower right-angle gear reduction units 71 and 72. The output shafts 73 and 74 of the gear reduction units 71 and 72 extend horizontally to the jacks 67 and 68 and operate the jacks through gearing 75 and 76.

When the jacks 67 retract the wedge 61, the upper thrust plate 19 and operating wedges 23 are moved upwardly by the springs 53 in the cap 50 of the mill housing. Likewise when the jacks 68 retract the wedge 62, the lower thrust plate 20 and lower operating wedge 24 move downwardly due to the force of gravity. This increases the spacing between the thrust plates 19 and 20 and thus permits removal of the roll assembly from the mill housing and saddle without disturbing the cap of the mill housing.

The operating mechanism 35 for the operating wedges 23 and 24 is designed to accommodate the vertical movement caused by wedges 61 and 62. The mechanism 35, as shown in FIGURE 6, is operated by the saddle operating unit D and includes a bell crank 79 which is rocked about its pivotal support by an eccentric and cam mechanism and connecting rod 80a. Bell crank 79 reciprocates a vertical link 81 that is pivotally connected at its upper end to toggle links 82 and 83 and at its lower end to toggle links 84 and 85, the links 83 and 85 being pivotallly connected at their opposite ends to brackets 86 and 87. The links 82 and 84 are pivotally connected at their other ends to links 88 antd 89 which are pivotally connected to brackets 90 and 91 on the mill housing C. The links 82 and 84 are also connected to links 92 and 93 which are pivotally connected to the operating wedges 23 and 24, respectively. This mechanism serves to operate the wedges 23 and 24 in the same manner as shown in the Krause patent and also accommodates vertical movement of the opering wedges during roll changing.

In order to eliminate lost motion or play in the jacks 67 and 68 and the wear and shock on the mechanism that might result from such motion, the adjusting wedges 61 and 62 are provided with upper and lower hydraulic cylinders 94 and 95, see FIGURES 2, 4 and 5, which serve to maintain an outwardly directed force on the adjusting wedges 61 and 62 at all times, thus taking up any lost motion or play that may be present in the jacks and associated mechanisms and retaining the wedges 61 and 62 in correct operating position.

Movement of the operating wedge 23 and the adjusting wedge 61 is guided by upwardly and downwardly extending lips 98 formed on opposite sides of the slide plate 64. Movement of the operating wedge 24 and adjusting wedge 62 is similarly guided by upwardly and downwardly extending lips 99 formed on opposite sides of the slide plate 65. The lips 98 and 99 engage the sides of the wedges and insure movement thereof along linear paths of travel. Vertical movement of the slide plates 64 and 65 is guided by means of vertical pins 96 and 97, respectively, the pins 96, of which there are two, extending through the cap 50 and into the thrust plate 19 as shown in FIGURES 3 and 6, and the pins 97, of which there are also two, extending upwardly through the base of the mill housing and into the lower thrust plate 20. The wedges 23, 24, 61 and 62 are provided with slots through which the pins extend so that the pins do not interfere with the operation thereof.

Saddle

The saddle 10, FIGURES 3, 4, 6 and 7, comprises two longitudinally extending side plates 100 and 101, plates 100 and 101 being apertured in order to receive the bearing blocks that support the die rolls 13 and 14 and the back-up rolls 17 and 18. The die roll 13 is supported by a pair of U-shaped bearing blocks 102 disposed at either end of the roll, and the die roll 14 is supported in a similar pair of inverted U-shaped bearing blocks 103. Bearing blocks 102 and 103 are slidably mounted within the recesses of the side plates 100 and 101, the blocks sliding in guides 104, see FIGURES 8, 9, 10 and 11.

The guides 104 are provided with removable bearing retaining plates 105 and the parts are so dimensioned that upon removal of these retaining plates, both pairs of bearing blocks can be removed from the saddle 10 carrying with them the rolls. The back-up rolls 17 and 18 are supported in bearing blocks 106 and 107 that are slidably mounted in the openings of the U-shaped bearing blocks 102 and 103, respectively.

Since the bearing blocks are slidable in the side plates 100 and 101, the die rolls 13 and 14 are held together when the operating wedges 23 and 24 are in their inner positions, and when the operating wedges are withdrawn, the rolls can move apart. When the operating wedges 23 and 24 are withdrawn, the lower die roll 14 is maintained in engagement with lower back-up roll 18, and the back-up roll 18 in engagement with the thrust plate 20 by the force of gravity. Similarly, when the operating wedge 23 is withdrawn, the upper rolls 13 and 17 are urged upwardly against the thrust plate 19 by compression springs 108 disposed in recesses in the bearing blocks 102 and 103 as shown in FIGURES 9 and 11. There are two springs 108 on each side of the saddle, and the upper ends of springs 108 act upwardly against the bottom of the recesses in the bearing blocks 102. The lower ends of the springs 108 are supported by the collars 109 and are slidable on the rods 110 that extend through the centers of the springs and are guided in the lower and upper bearing blocks. In working position as shown in FIGURES 8 and 9, the collars 109 are urged upwardly to compress the springs 108 by cooperating wedges 111 that extend through slots in the collar. The enlarged lower ends 112 of the rods 110 normally bear on plates 113 secured to the side members 100 and 101, thus transmitting the thrust of the springs 108 and the load imposed by the weight of the rolls 13 and 17 to the side members. The springs 108 hold the rolls 13 and 17 upwardly in proper position separating the working rolls when the wedges are withdrawn, and allow the rolls to be moved downwardly to working position when the wedges are replaced. The rods 110 also function to secure the rolls together in a unitary assembly during removal and replacement of the rolls as will be described below.

In order to insure proper rotation of the rolls during reciprocation of the saddle 10, the upper thrust plate 19 carries racks 114 that engage pinions 115 on the upper back-up roll 17. These pinions in turn engage pinions 116 on the upper die roll 13. A similar arrangement consisting of racks 117 and pinions 118 and 119 is employed for driving the lower rolls 14 and 18.

The side members 100 and 101 are held together in a rigid structure by lower transverse beams 120 and upper tie rods 121, see FIGURE 6. The beams 120 support transverse supporting plates 122 and 123 which serve as tracks for rollers 124 and 125 mounted on the lower bearing blocks 103, the plates 122 and 123 being level with and closely adjacent the plates 113 to provide for the continuous travel of the rollers 124 and 125 through the saddle and mill housing during changing of the roll assembly, as will be more particularly described below, see FIGURE 11. Two pairs of tandem rollers are mounted on each bearing block 103 on opposite sides thereof.

The rollers 124 and 125 are normally carried slightly above the transverse plates 122 and 123 and the plates 113 as shown in FIGURE 9. During roll changing, however, when the adjusting wedges 61 and 62 are retracted to raise the thrust plate 19 and lower the thrust plate 20, the nuts 126 on the threaded upper ends of the rods 110 are screwed down to raise the rods relative to the lower bearing blocks 103 to the position shown in FIGURE 11, and the rollers 124 and 125 support the rolls on the plates 122 and 123 and the plates 113.

The die roll bearing blocks 102 and 103 and back-up roll bearing blocks 106 and 107 are provided with brackets 127 at each end which are aligned in pairs as shown in FIGURES 10 and 11 and which are provided with open slots. During the roll changing operation, bolts 128 are passed through the slots of each pair and fastened with nuts to secure the blocks during both removal and insertion.

Also, during roll changing, rectangular keys 129 are inserted between the upper bearing blocks 102 and lower bearing blocks 103 in opposed keyways formed therein as shown in FIGURES 10 and 11 to prevent lateral shifting of the bearing blocks relative to one another.

Roll changing conveyors

Figure 15:
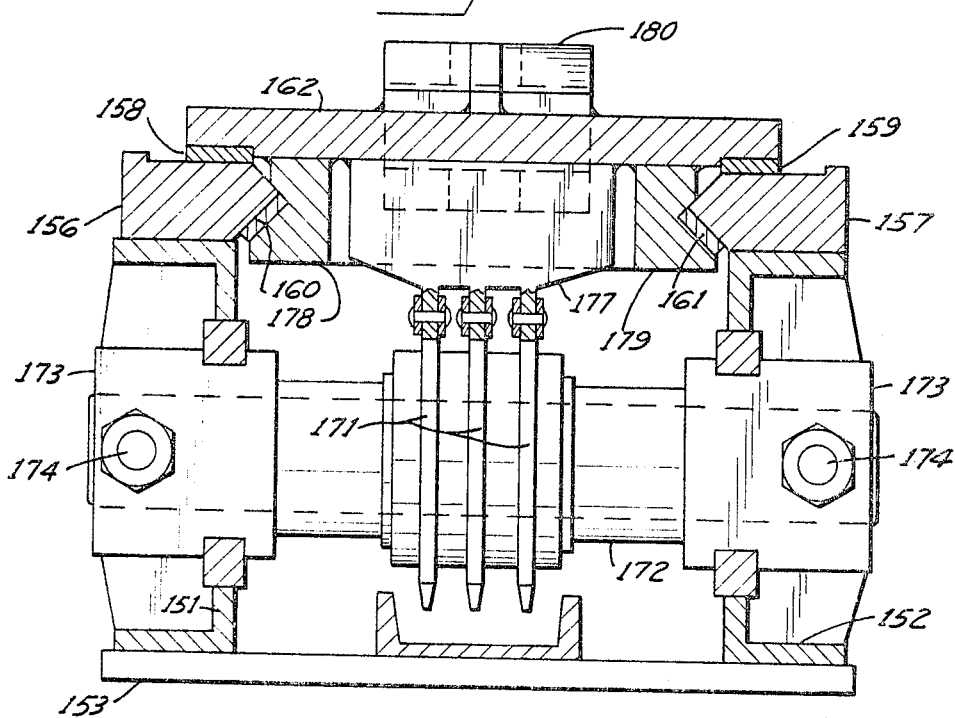
FIGURE 15 is a sectional view taken on the line 15—15 of FIGURE 14.

Construction and operation of the roll changing mechanism is shown in FIGURE 7 and FIGURES 13 to 15. In the drawings, the roll assembly removal conveyor G is mounted on the left side of the mill housing as viewed in FIGURE 7, and the roll assembly replacement conveyor H is mounted on the right side. Nevertheless, conveyors G and H can be interchangeably used for either removal or replacement of roll assemblies as desired. Accordingly, the roll assembly travels to the left during removal as viewed in FIGURE 7 as does the replacement assembly during insertion. Since the construction of the removal conveyor G is substantially identical to that of the replacement conveyor H, only the replacement conveyor H is described in detail herein. The same reference characters have, in general, been applied to corresponding parts of conveyor G. The conveyor H comprises two channel members 151 and 152 mounted parallel to one another and which together support the rest of the mechanism. The channel members 151 and 152 are carried by supporting plates 153 and 154 and 155, the plates 154 and 155 resting on a suitable base and the supporting plate 153 resting on the base plate 46 of the mill housing C as shown in FIGURE 14. Mounted on top of the channel members 151 and 152 are slides 156 and 157 having low friction plates 158 and 159. The inner ends of each of the slides 156 and 157 are chamfered to provide an edge with a triangular cross section as shown in FIGURE 15. Mounted on the lower chamfered part of each edge is a low friction strip 160 and 161. The plates 158 and 159 of slides 156 and 157 of both the removal conveyor G and replacement conveyor H are positioned with their inner ends level with and abutting the plates 113 of the mill housing to provide a level track for the rollers 124 and 125 which support the roll assembly during the roll changing operation, the track extending through the mill housing and along the length of each conveyor as shown in FIGURE 7.

In order to move the roll assemblies on the tracks, conveyor H is provided with a carriage 162 which slides along both slides 156 and 157 and which is propelled by means of three drive chains 164, 165 and 166 as best shown in FIGURES 13 and 14. A similar carriage 163 is provided on conveyor G. The chains 164, 165 and 166 are driven by a drive sprocket 167 mounted on a drive shaft 168 which is driven by a suitable drive motor 169 through a right angle gear reduction unit 170, see FIGURE 1A. The opposite ends of the chains 164, 165 and 166 are carried by idler sprockets 171 mounted on an idler shaft 172 journaled in bearings 173.

The roll assembly carriage 162 is secured to the drive chains 164, 165 and 166 by means of a carrier member 177 secured to the bottom of the carriage. Guide members 178 and 179 at opposite ends of the carriage engage the wear strips 160 and 161 to assure proper alignment of the trolley 162 on the slides.

The inner end of trolley 162 is provided with a bifurcated connector 180 which may be used to secure the trolley 162 to a connector plate 181 secured to the lower bearing blocks 103 by means of a pin 182 that is passed through openings in both forks of the connector 180 and through an opening in the connector plate 181, see FIGURE 14. A stop 183 is located at the outer end of each conveyor G and H to limit the outward movement of the carriages 162 and 163.

Operation

The operation of the machine as a whole is similar to the operation of the machine described in the above-mentioned Krause patent; therefore, only the roll changing operation is described herein. Referring particularly to FIGURE 7, the replacement roll assembly which is to be inserted in the saddle 10 is first positioned on the roll assembly replacement conveyor H and the connector plate 181 of the lower bearing block of the assembly secured by means of a pin 182 to the connector 180 of the carriage 162 which was initially positioned near the outward limit of its movement on the conveyor H. The saddle 10 is positioned midway between the limits of its reciprocating travel with the operating wedges 23 and 24 in their closed positions. The die roll bearing blocks 102 and 103 and back-up roll bearing blocks 106 and 107 are secured together by means of the bolts 128. The carriage 163 is brought into position on conveyor H adjacent the connector plate 181 at the bottom of the roll assembly to be removed. The keys 129 are inserted in their keyways, wedges 111 are removed, and the nuts 126 on the upper ends of the rods 110 are tightened down to join the rolls that are to be removed from the machine into a unitary assembly. The bottom adjusting wedge 62 is then retracted by means of the jacks 68, lowering the roll assembly until the rollers 124 and 125 mounted on the lower bearing blocks 103 rest on the plates 113 on the mill housing and the transverse plates 122 and 123 on the saddle 10 as shown in FIGURES 10 and 11. Removing the wedges 62 also lowers the tracks 117 and disengages them from pinions 118.

The top adjusting wedge 61 is also retracted allowing the upper operating wedge 23 and thrust plate assembly 19 to move upward in response to the force of the springs 53 in the cap 50 to provide additional clearance during removal of the roll assembly and disengage the racks 114 from the pinions 115.

Figure 12:
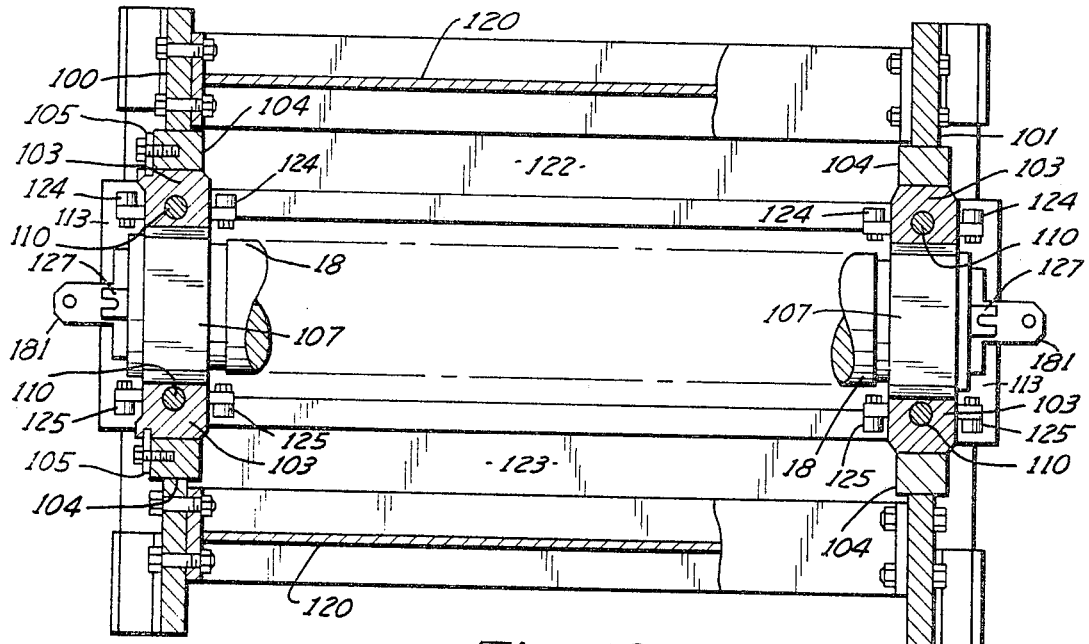
FIGURE 12 is a plan view of the mill housing and saddle taken on the line 12—12 of FIGURE 8 with parts broken away and shown in section.

The bearing block retaining plates 105 on the left hand side of the saddle as viewed in FIGURE 12 are then loosened and moved outward as shown in FIGURE 10 to provide clearance for removal of the roll assembly. At this point the machine is prepared for removal of one roll assembly and insertion of the replacement assembly. This is accomplished by operating the roll assembly removal conveyor G to withdraw the roll assembly from the saddle and mill housing, the assembly rolling on the plates 113, 122 and 123 and the slides 156 and 157 until the roll assembly is in a position clear of the mill housing C. The bearing block retaining plates 105 may then be replaced.

The roll assembly replacement conveyor H is then operated to push the replacement assembly into the saddle 10 until the die rolls 13 and 14 are in their properly aligned position. This may be done simultaneously with the removal of the other roll assembly if desired.

The bearing block retaining plates 105 are then replaced.

The lower adjusting wedge 62 is then moved inwardly to lift the lower operating wedge 24 and lower thrust plate 20 assembly upward so that the thrust plate 22 engages the back-up roll 18, the connector 180 of the trolley 163 having first been disconnected from the connector 181 of the roll assembly. This also causes the racks 117 to engage pinions 118.

The top adjusting wedge 61 is simultaneously operated and moved inwardly compressing the springs 53 in the mill cap 50 to lower the upper operating wedge 23 and thrust plate 19 assembly so that the thrust plate 21 engages the back-up roll 17. It will be noted that in some instances, the upper adjusting wedge 61 need not be moved during roll changing if the lower adjusting wedge 62 alone provides enough clearance between the thrust plates 19 and 20 for roll changing. The bolts 128, which fasten each die roll and back-up roll pair together, and the keys 129 are then removed, wedges 111 are inserted, and the nuts 126 on rods 110 are loosened. Then the carriage 162 is moved outwardly out of the way. The machine is then in condition for operation with the replacement die rolls.

It will be evident from the foregoing that the invention provides a construction whereby rolls of tube rolling machines can be removed and replaced with a substantial reduction in downtime as compared to prior type machines. This advantageous result is achieved by the arrangement in which one assembly of rolls can be positioned adjacent the machine ready for insertion in the machine as soon as the assembly within the machine is removed, without requiring any handling of an assembly by cranes while the machine is shut down. Also, the construction whereby the cap of the mill remains secured to the mill housing reduces the time required for changing rolls and provides a stronger and less expensive construction for the mill housing. The wedges above and below the operating wedges not only provide the necessary clearance to permit the withdrawal of the assembly of rolls, but also provide for adjusting the position of the operating wedges to accommodate rolls of different sizes and adjusting the pre-loading imposed upon the rolls in the machine.

It will be understood that this invention has been shown and described with reference to a preferred embodiment thereof which is intended for the purpose of illustration rather than limitation, and other variations and modifications will be apparent to those skilled in the art within the intended spirit and scope of the invention, wherefore the patent is not to be limited to the form or forms of method and apparatus herein as specifically illustrated and described nor in any other manner inconsistent with the progress by which the art has been promoted by this invention.

We claim:

1. In a rolling machine having a mill housing, a saddle mounted for reciprocation in said mill housing and mill rolls carried by said saddle, thrust plates for backing up said rolls, the rolling forces exerted on said rolls being transmitted through said thrust plates to said mill housing, bearing blocks mounted in said saddle for supporting said rolls, means for temporarily securing said bearing blocks together to provide an assembly of rolls and bearing blocks that can be handled as a unit, said assembly being removable from said saddle from one side thereof, said mill housing having an aperture on one side thereof permitting passage of said assembly therethrough; the improvement comprising the provision of adjustable means including retractible load bearing members interposed between at least one of the thrust plates and the mill housing for reducing the spacing between the adjacent thrust plate and the mill housing when retracted and thereby increasing the distance between the thrust plates to provide clearance between said thrust plates and the rolls, and means for conveying said assembly of rolls and bearing blocks transversely of the saddle through the aperture in the mill housing to a position alongside said machine.

2. A machine according to claim 1 wherein the adjustable means comprises a wedge and means for inserting and retracting the wedge to vary the spacing between the thrust plate and the mill housing.

3. A machine according to claim 2 wherein the means for inserting and retracting the wedge comprises a jack operatively connected to the wedge, drive means for the jack and means for maintaining a biasing force on the jack to eliminate play in the jack mechanism.

4. A machine according to claim 3 wherein a hydraulic cylinder is employed to apply a force to the wedge tending to retract the wedge thereby to take up play in the jack.

5. A machine according to claim 2 having an upper thrust plate and a lower thrust plate and a movable wedge disposed between each thrust plate and the adjacent members of the mill housing.

6. A machine according to claim 1 wherein the means for conveying the assembly of rolls and bearing blocks comprises rollers mounted on said assembly, rail means supported by said saddle and said mill housing adapted to support said rollers and a roll assembly conveyor disposed adjacent one side of said mill housing and adjacent the aperture therein, said conveyor having rails for supporting a roll assembly and having a carriage adapted to be connected to a roll assembly and move said assembly along said rails.

7. A rolling machine according to claim 1 wherein said mill housing has apertures on both sides thereof to permit passage of an assembly of bearing blocks and rolls therethrough, and wherein two means for conveying the assembly of rolls and bearing blocks are provided, one disposed on one side of the mill housing and the other disposed on the other side of the mill housing.

8. In a rolling machine having a mill housing, a saddle mounted for reciprocation in said mill housing, a pair of die rolls, a pair of back-up rolls carried by said saddle and means tending to separate said die rolls, and oppositely spaced thrust plates carried by said mill housing for engaging said back-up rolls and transmitting the rolling forces exerted on said rolls to said mill housing, said back-up rolls being normally in rolling engagement with said thrust plates; the improvement which comprises a movable wedge interposed between said thrust plates and said mill housing for changing the spacing between said thrust plates and the mill housing and the distance between said thrust plates, and jacks operatively connected to said wedges and drive means for operating said jacks.

9. A rolling machine according to claim 8 having a fluid pressure cylinder and piston mechanism associated with each jack for eliminating play therefrom.

10. In a rolling machine having a mill housing, a saddle mounted for reciprocation in said mill housing, said saddle making a working stroke in one direction and a return stroke in the opposite direction, a pair of working rolls, a pair of back-up rolls carried by said saddle, and means tending to separate said working rolls, said mill housing having thrust plates for engaging said back-up rolls and transmitting the rolling forces exerted on said rolls to said mill housing, wedge mechanisms operated in timed relation with the reciprocation of said saddle for retaining said thrust plates in position to urge said working rolls into contact with work disposed between them during the working stroke of the saddle and for permitting said thrust plates to move away from each other and said working rolls to become disengaged from the work during the return stroke of the saddle, bearing blocks mounted in said saddle for supporting said rolls, means for temporarily securing said bearing blocks together whereby the assembly of working rolls, back-up rolls and bearing blocks can be handled as a unit, said mill housing having an aperture on one side thereof permitting removal of said bearing blocks and rolls therethrough, the improvement comprising the provision of adjustable wedge means interposed between said wedge mechanisms and said mill housing and adapted to be withdrawn to increase the clearance between the said thrust plates and said mill housing and thereby increasing the distance between said thrust plates to provide clearance between said thrust plates and said mill rolls, and means for conveying said assembly of rolls and bearing blocks transversely of the saddle through said aperture to a position alongside said machine.

11. A machine according to claim 10 having racks associated with said thrust plates and pinions associated with the rolls for positively driving said rolls as said saddle reciprocates, said pinions being disengaged from said racks when said bearing blocks are secured together and said wedge means are withdrawn.

References Cited

UNITED STATES PATENTS

| 2,037,210 | 4/1936 | Buente | 72—239 |
| 3,199,326 | 8/1965 | Wadleck et al. | 72—198 |

CHARLES W. LANHAM, *Primary Examiner.*

A. RUDERMAN, *Assistant Examiner.*

U.S. Cl. X.R.

72—189; 324—1; 340—18